United States Patent [19]
Van Dijk et al.

[11] Patent Number: 5,430,073
[45] Date of Patent: * Jul. 4, 1995

[54] PROCESS FOR PREPARING POLYMERS AND MOULING COMPOUNDS BASED THEREON

[75] Inventors: Hans K. Van Dijk, Geleen; Ronald M. A. M. Schellekens, Meerssen; Markus J. H. Bulters, Sittard; Olav M. Aagaard, Maastricht; Gerard P. De Vries, Venray; Matthias J. G. Brouns, Kerkrade, all of Netherlands

[73] Assignee: DSM, N.V., Heerlen, Netherlands

[ * ] Notice: The portion of the term of this patent subsequent to Jan. 31, 2012 has been disclaimed.

[21] Appl. No.: 91,366

[22] Filed: Jul. 15, 1993

Related U.S. Application Data

[63] Continuation-in-part of Ser. No. 820,812, Jan. 15, 1992, abandoned, and a continuation-in-part of Ser. No. 820,977, Jan. 15, 1992.

[30] Foreign Application Priority Data

Jan. 17, 1991 [NL] Netherlands ............ 9100085
Jan. 17, 1991 [NL] Netherlands ............ 9100086
Jul. 15, 1992 [NL] Netherlands ............ 9201275
Jul. 15, 1992 [NL] Netherlands ............ 9201277

[51] Int. Cl.⁶ ................................ C08L 79/04
[52] U.S. Cl. ........................... 522/66; 522/167;
522/168; 525/186; 525/203; 525/279; 525/284;
526/256; 526/258; 526/270; 528/265; 528/270;
528/360; 528/361; 528/328; 528/380; 528/417;
528/423
[58] Field of Search ............. 525/279, 284, 203, 186;
522/66, 167, 168; 526/256, 258, 270; 528/265,
270, 328, 360, 361, 380, 417, 423

[56] References Cited

U.S. PATENT DOCUMENTS

| 4,500,687 | 2/1985 | Wolfe | 525/412 |
|---|---|---|---|
| 4,604,427 | 8/1986 | Roberts et al. | 525/185 |
| 4,617,353 | 10/1986 | Myers | 525/279 |
| 4,636,430 | 1/1987 | Moehwald | 428/311.5 |
| 4,697,001 | 9/1987 | Walker et al. | |
| 4,769,430 | 9/1988 | Naitoh | 526/256 |
| 4,824,871 | 4/1989 | Shinomura | 521/54 |
| 4,863,792 | 9/1989 | Mrozinski | 428/315.5 |
| 4,940,517 | 7/1990 | Wei | 204/78 |
| 5,019,260 | 5/1991 | Gsell et al. | 428/315.5 |
| 5,132,049 | 7/1992 | Garvem et al. | 252/500 |
| 5,149,826 | 9/1992 | Delabougzise et al. | 548/518 |

FOREIGN PATENT DOCUMENTS

| 206414 | 12/1986 | European Pat. Off. | |
| 0219063 | 4/1987 | European Pat. Off. | |
| 0330345 | 8/1989 | European Pat. Off. | |
| 0495549 | 7/1992 | European Pat. Off. | |
| 1234435 | 9/1989 | Japan | 521/53 |
| 9103920 | 3/1991 | WIPO | |

OTHER PUBLICATIONS

CA114(8):63061p. "Preparation of Aromatic Electrically Conducting Polymers", Ouchi et al. (Abstract only).
DePaoli et al. "Electrically Conductive Plastic Composite (1985) Derived from Polypyrrole & PVC" Journal of Polymer Science V. 23 Polymer Chemistry Edition 1687–1699.
Encyclopedia of Polymer Science & Engineering, v. 13 pp. 291–292.
*Showa Denko KK,* Electroconductive Pyrrole Polymer Powder Prepn.—By Polymerising Polymer In Inactive Gas Atmosphere In Presence Of Oxidation Catalyst; Derwent Abstracts, AN=86–050864 and J-6-1002-72-8-A, Jan. 8, 1986.
PCT Search Report, 7633WO, Oct. 20, 1993.
PCT Search Report, 7494WO, Oct. 20, 1993.

*Primary Examiner*—James J. Seidleck
*Assistant Examiner*—Patrick R. Delaney
*Attorney, Agent, or Firm*—Cushman, Darby & Cushman

[57] ABSTRACT

The invention relates to a process for preparing a polymer in which in situ polymerization of monomers takes place in the presence of a catalyst, in which the monomers are obtained by in situ activation of precursor monomers.

According to the invention a premature polymerization is avoided, but polymerization only starts at the desired moment.

13 Claims, 3 Drawing Sheets

PROCESS FOR PREPARING POLYMERS AND MOULING COMPOUNDS BASED THEREON

RELATED APPLICATIONS

This application is a continuation in part of U.S. application Ser. No. 07/820,812 filed on Jan. 15, 1992 and of U.S. application Ser. No. 07/820,977 filed Jan. 15, 1992, the complete disclosures of which are incorporated herein by reference.

FIELD OF THE INVENTION

The invention relates to processes for preparing a polymer in which precursors to monomers are activated whereafter in situ polymerization of the monomers takes place in the presence of a catalyst and to electrically conductive polymers and articles.

BACKGROUND OF THE INVENTION

In situ polymerization of monomers in the presence of a catalyst is a process frequently used in the preparation of polymers. In this process, for instance, polymerizable monomers are added to a catalyst-containing solution. This process is often used in the preparation of an intrinsically conducting polymer.

A process for the in situ preparation of an intrinsically conducting polymer is described in U.S. Pat. No. 4,617,353. In that process, a matrix polymer is dissolved in a liquid solvent. This solvent also contains a suitable catalyst. Subsequently, a polymerizable monomer is added to that solution, upon which this monomer polymerizes to form an intrinsically conducting polymer.

Although it is in principle suited for the in situ preparation of a polymer, the process mentioned in U.S. Pat. No. 4,617,353 presents a number of practical problems. The catalyst is present in the solution, and as a consequence the polymerization reaction commences immediately after the addition of the monomer. Thus, a polymer is obtained instantaneously. In order subsequently to give form to the polymer, or to a blend thereof, a (number of) processing step(s) is required. This instantaneous polymerization reaction is not desirable if one or more further processing steps are necessary, because the prepared polymer, or a blend hereof with other polymers, is very hard to process or cannot be processed at all.

The intrinsically conducting polymers mentioned in U.S. Pat. No. 4,617,353 are very hard to process or cannot be processed at all. Consequently, it is quite difficult to shape or mould compounds containing such intrinsically conducting polymers to obtain products having intrinsically conducting properties.

A process for producing an electrically conductive article is disclosed in Europe 314311. In this process monomers present in the polymer composition are polymerized to yield a conjugated polymer, would be desirable to stretch the polymer's composition or during the polymerization step to obtain good mechanical properties. However, as a practical matter, it is not readily possible to conduct that process as described wherein those two process steps are simultaneously carried out. The reason is the fast rate of the polymerization reaction of the monomers. At the temperatures prevailing during the stretching step, the polymerization reaction proceeds instantaneously. In view of the relatively long time which is needed for the stretching step, it is impossible to allow the two processes to proceed simultaneously over a prolonged period. In general, in the known process, the polymerization reaction is already complete while the major part of the stretching step has yet to take place. In practice, the bulk of the stretching step is takes place after polymerization of the monomers. As a result the desired combination of properties is not obtained. Thus, it is not possible to produce an article which has both good mechanical properties and good electrically conducting properties by the above-mentioned process.

Another process is disclosed in Synthetic Metals, 4: 217-221 (1988). According to the process as there described, pyrrole monomers are polymerized in the presence of a catalyst to yield the electrically conducting polypyrrole polymer. During the polymerization, the release of protons leads to incorporation of an amount of 2,5-bis-(2-pyrrolyl)pyrrolidine (BPP) in the polypyrrole. This gives rise to a significant reduction of the electrically conducting properties. To largely avoid the undesirable incorporation of the BPP impurity in polypyrrole, polymerization must occur in a reaction mixture that is pH buffered, in such a manner that the pH is greater than 1 but lower than 7. To this end a buffer is added to the reaction mixture. This results in a significant improvement of the electrically conducting properties of the electrically conducting polymer that is obtained.

Although the process described in Synthetic Metals is suitable for the preparation of an electrically conducting polymer with good electrically conducting properties, it has major disadvantages. The polymerization reaction of the monomer units is immediately initiated in the presence of a catalyst. As a result, an electrically conducting polymer is directly obtained, which is precipitated as a powder in the reaction mixture. The precipitate thus formed is not suitable for thermoplastic processing and is not or hardly capable of being shaped into a coherent moulding compound.

SUMMARY AND OBJECTS OF THE INVENTION

Figure 1:
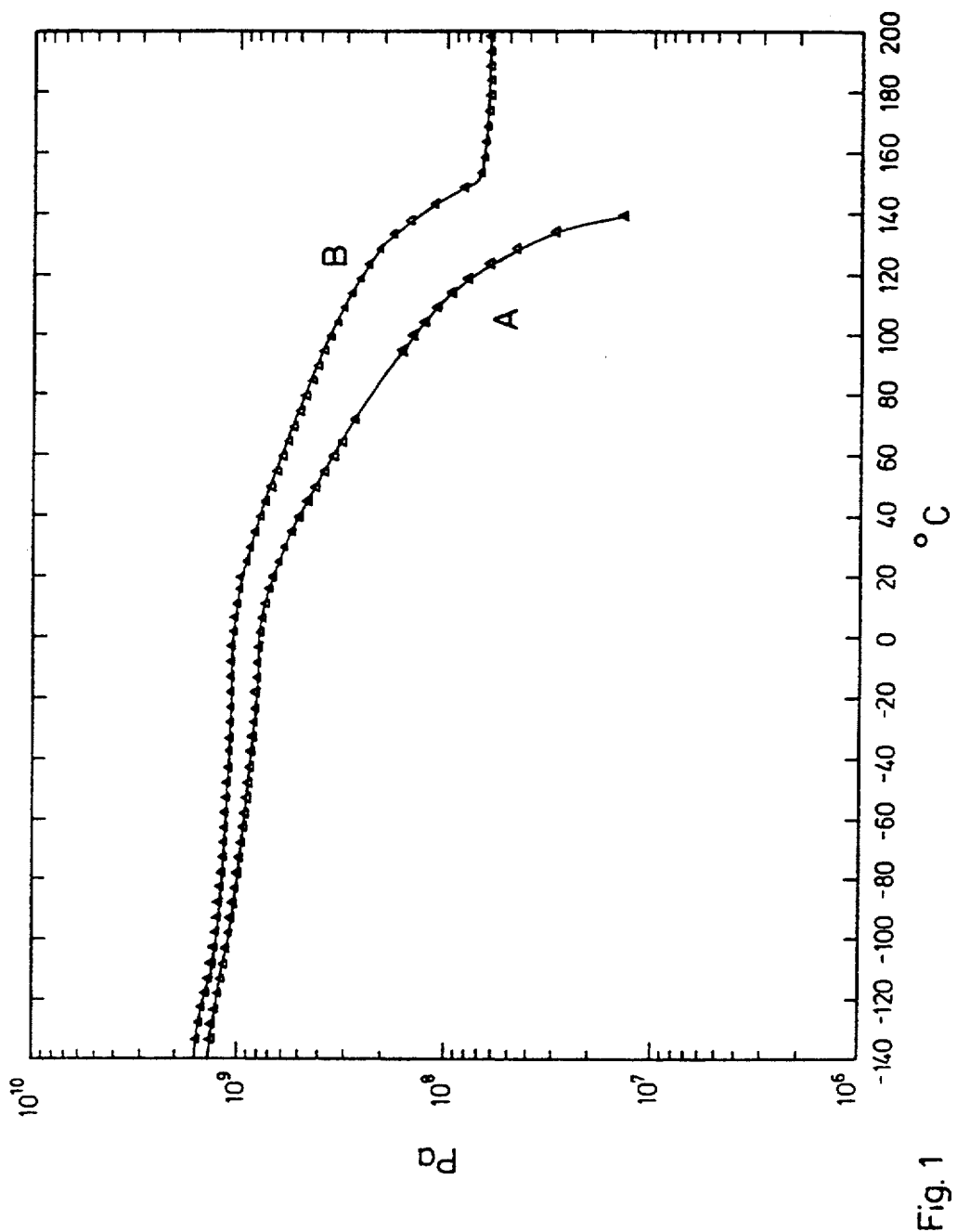
FIG. 1 shows the temperature dependence of the dynamic modulus of the basic film and that of a coated film according to the present invention.

The present process for preparing a polymer in which in situ polymerization of monomers is allowed to occur in the presence of a catalyst, eliminates the disadvantages with the heretofore known processes. According to the present invention, polymerizable monomers are obtained following in situ activation of precursors to those monomers (hereinafter sometimes referred to "precursor monomers").

Using a present process, it is possible in simple processing steps to give form to molding compounds and to manufacture products containing polymers that are hard to process. According to the invention, premature polymerization is avoided while polymerization only starts at the desired moment.

The present processes can produce microporous films having improved temperature resistance. These films are comprised of a first polymer that are coated, internally and externally, with a second polymer which has a softening point greater than that of the first polymer, and which is obtained following the activating of precursor monomers. This process avoids the serious disadvantages associated with films produced using lamination techniques. The films according to the present invention can be used in filtration of solids, ultra-filtration of colloidal mixtures, as diffusion barriers, separation membranes in electrolytic cells, as selective cleaning filters for liquids, and in clothing. With respect to cleaning filters for liquids, the coated microporous films of the present invention may be filled or unfilled.

DETAILED DESCRIPTION OF THE INVENTION

The process of the present invention comprises in situ activating precursor monomers to obtain polymerizable monomers, and allowing the monomers to polymerize in the presence of a catalyst to obtain the desired polymer. In a process according to the present invention the precursors to the polymerizable monomers can be formed into a desired form prior to activation, whereafter the precursors can be activated in situ at the preselected moment to obtain a formed article. In the process according to the present invention, any precursor to a polymerizable monomer can be used.

A further process embodiment involving means for preparing a porous and temperature resistant microporous film from a thermoplastic polymer is described in U.S. application Ser. No. 07/820,977, the disclosure of which is incorporated by reference. This process embodiment comprises at least partially coating a microporous-film of a first polymer with a layer of a second polymer. In this embodiment, a non-polymerizable precursor to a polymerizable monomer of the second polymer plus a catalyst for the monomer are applied to a microporous film comprised of a first polymer. Thereafter, the non-polymerizable precursors are activated to obtain the polymerizable monomers, which monomers polymerize in the presence of the catalyst whereby internal and external surfaces of the microporous film receive a continuous coating layer comprised of the second polymer.

More particularly, a very suitable process for the preparation of a film according to this embodiment of the invention comprises impregnating a porous film of a first polymer with a mixture comprising a precursor to a monomer and a catalyst for the polymerization of the monomer to the desired second polymer followed by conversion of the precursor to the monomer and subjecting the film to conditions at which the monomer polymerizes. This embodiment has proven to be eminently suitable for the application of a coating layer of polypyrrole, a polythiophene, a polyfuran, a substituted form thereof, or a mixture of two or more of these substances. This embodiment is also suited for the application of a coating layer to only a part of the surface of the film, for instance to one or both outer sides of the film by applying that mixture only the parts that are to be coated. At temperatures below the softening point of the second polymer, but above the softening temperature, and even above the melting point, of the first polymer, the microporous film according to the invention retains its shape and dimensions. The film retains its porosity and permeability on account of its dimensional stability. These microporous films also possess sufficient mechanical stability for use at those temperatures. This extension of the temperature range within which the microporous film can be usefully employed increases with the difference between the softening temperatures of the second and the first polymer. The advantage becomes especially manifest in films formed from thermoplastic polymers with relatively low softening and melting points, such as polyolefins. The first polymer is preferably a polyolefin. Use of the film at higher temperatures than the one at either the thermoplastic polymer (first polymer) or of the coating layer (second polymer) undergo thermal degradation is to be avoided.

In this embodiment, particularly suitable thermoplastic-polymeric coating layers are those which essentially consist of a material chosen from the group consisting of polypyrrole, polythiophenes, polyfurans, a substituted form of these, or a mixture of two or more of these substances. A polyethylene film, provided with such a coating layer possesses an excellent electrical conductivity of at least 0.001 S/cm, and in many cases even comparable to that of an object consisting wholly of the coating material. Objects consisting of other polymers with a coating layer of the said materials also prove to be electrically conductive. They also are dimensionally stable at temperatures up to about 350° C., but at these higher temperatures the films appear to loose their electrical conductivity. In addition, the film in this case appears to be dimensionally stable even upon heating to temperatures far above the melting point of the polyethylene, while after cooling the mechanical properties such as strength and stiffness are still very good, comparable to those before heating. By preference, therefore, the coating layer essentially consists of a polypyrrole, a polythiophene, a polyfuran, a substituted form hereof, or a mixture of two or more of these substances.

Advantageously, the coating layer on the film according to the invention can be thin. As a consequence, the film pores are not entirely filled or closed. As a consequence, the porosity, the primary functional property of the microporous film, is essentially retained. Given the uses of this film, the porosity of the film preferably is at least about 30%, more preferably at least about 50%, and most preferably at least about 65%. The permeability, expressed as the Gurley value, is better than about 100 s/50 ml, although it is preferably better than about 70 s/50 ml, although the value may, if desired, be lower, such as about 30 s/50ml. It should be noted that a better, i.e. higher, permeability corresponds to a lower Gurley value, expressed in s/50 ml. Because the porosity is retained, the pores of the film can, if desired, be filled with suitable substances that add a desired functionality. Thus, for instance, so-called breathable objects are manufactured by filling a porous structure with a substance which, while being capable of transporting water and releasing it to the environment in the form of vapour, is impervious to water in liquid form. Another example are separation membranes, which can be obtained by filling a porous film with ion-selective substances.

Porous films of which only the external surface is provided with a coating layer are known, for instance from U.S. Pat. No. 4,194,041. This patent discloses a method for applying a layer of hydrophilic material to a layer of hydrophobic material to serve as a barrier against certain harmful substances. However, this disclosed method requires a lamination step. This method produces products which suffer from the disadvantages pertaining to a laminate structure such as, for instance, the risk of delamination under load with the resultant exposure of the externally applied coating layer and the non-coated side of the laminate to damaging ambient conditions. Moreover, the coating layer may act as a skin covering the pores and exercise a considerable negative effect on the overall porosity and permeability. In addition, this known film does not appear to possess the temperature resistance exhibited in a film according to the invention.

Microporous films completely filled ports are, for instance, in U.S. Pat. No. 4,613,544. Following that disclosed process, a hydrophilic material or a precursor thereof is introduced, in the form of a solution, in the pores, where it is converted into the solid state. According to this process, it is a requirement that the pores are sufficiently filled to prevent material transport, for instance of water, otherwise than by the action of the filler material. Such a filling is certainly suitable for improvement in certain respects of the functionality of the porous structure, but disadvantageously, it greatly reduces the porosity of the total structure. Moreover, also a film manufactured in this way does not appear to possess the temperature resistance that is inherent in the film according to the invention.

Various methods are available to prepare a microporous film which can be coated in accordance with the present invention. Microporous films of a first polymer can be obtained in accordance with procedures available to those skilled in the art. For example, Europe A-105,169, Europe B-160,551, and PCT Int'l WO-A-86/02282, the disclosures of which are incorporated by reference, describe processes for preparing porous films starting from a solution of a thermoplastic material. U.S. Pat. No. 4,833,172, the disclosure of which is incorporated by reference, discloses that a microporous film is obtained by stretching a precursor material composed of ultrahigh molecular weight polyethylene and a silica-like filling. Porous films comprised of polytetrafluoroethylene (PTFE) are described in U.S. Pat. Nos. 4,110,392 and 4,187,390, the disclosures of which are incorporated herein by reference.

In the context of the invention a film includes foils, tapes and hollow fibers or tubes. The external surface of the film designates the part of the film that is directly exposed to the environment. This external surface substantially comprises the two opposing sides of the film. A microporous film according to the invention can possess a pore system where pores extend from one side of the film to the opposite side without there being contact between the pores. However, preferably the film possesses a pore system consisting of a three-dimensional network of pores ending in both sides of the film, and thus being in open connection with the film's environment. A combination of the two systems is also possible.

The internal surface of the film denotes all of the polymeric material that covers the pores and that is in open connection with the environment through the pores. The form of the pores is not critical, and neither are any specific demands to be met by the tortuosity, that is the average ratio between the length of a path through the pores from an opening in one side of the film to an opening in the opposite side, and the distance, measured in a straight line, between the said openings. The average minimum dimensions of the pores is preferably between 0.001 and 20 ~m, and more preferably between 0.01 and 10 ~m. The external surface and the internal surface can be provided with a continuous coating layer. A continuous coating layer includes not only a layer covering 100% of the surface area of the first polymer, but also a coating layer that is not entirely closed, with scattered small uncoated portions. The coating layer covers at least about 70%, and preferably at least about 90%, of the surface area of the first polymer. Most preferably, however, the coating layer fully covers the first polymer.

The coating layer should be strong enough to withstand the forces, for instance relaxation or expansion forces, which occur upon an increase in the temperature in the first polymer, without substantial dimensional changes, preferably less than 5% in the area of the film. The ratio between the amount of the first polymer and the total coated surface area of the eventual film determines the stress in the coating layer. This ratio, and thus the stress in the coating layer, can be lowered both by increasing the thickness of the coating layer and by starting from a film having a higher porosity in the preparation of the film according to the invention. It should be noted that said measures have a contrary effect on the porosity of the resulting coated film. Depending on the choice of the first and the second polymer and of the intended application and desired porosity, one skilled in the art will be able to determine the most suitable combination of porosity of the starting film and thickness of the coating layer by routine experiments.

In yet another embodiment, a polymer composition containing an electrically conducting polymer is obtained by activating non-polymerizable precursors of monomers to obtain polymerizable monomers, and allowing the monomers to polymerize in the presence of a catalyst and a pH buffer. The precursors to the polymerizable monomers can be, such as placing in a mold, are thereafter activated. In this manner, single processing steps can be used to shape molding compounds and manufacture articles that contain electrically conducting polymers.

In this aspect of the invention, the reaction mixture contains a pH buffer so that the pH of the mixture, which contains precursor monomers, catalyst, and pH buffer, is approximately between 1 and 7. A suitable pH buffer is, for instance, the conjugated base of a weak acid in the form of a carboxylate, for example a carbonate, a bicarbonate, an oxalate, an acetate, a formate, and a phthalate; a phenolate containing an electron-attracting group, such as, for example, 3-nitrophenolate, 3-chlorophenolate and 3,5-dinitrophenolate; or a phosphate. An amide can also be used, and illustrative of such amides are urea, formamide, acetamide, and N-acetyl benzamide. The amide can also be a tertiary amine, and exemplary such amines are triethylamine, 1,4-diazabicyclo[2.2.2]octane and aromatic amines such as pyridine, imidazole, pyrazine and pyrimidine. Mixtures of buffers can also be used. By preference, urea is contained in the buffer. The buffer is added in an amount effective to catch protons released during the polymerization reaction, and the pH of the reaction mixture preferably does not rise higher than about 7.

DEFINITION OF PRECURSOR MONOMER

As contemplated herein, a precursor monomer means a molecule not capable of polymerizing as such under the prevailing process conditions before the precursor is activated, even in the presence of a polymerization catalyst. After a simple conversion step, however, this molecule is converted into a polymerizable monomer unit. A polymerizable monomer can be obtained in such a conversion step by removal of a blocking group that screens off, i.e. protects, one or more reactive positions of a precursor to a monomer. It is also possible to effect a conversion, i.e., activation, by removing an electron-attracting group, which increases the oxidation potential of the molecule, so that polymerization proceeds. In another embodiment, an intramolecular reaction takes place such as, for instance, a retro-Diels-Alder reaction, to convert a precursor monomer into a polymerizable monomer unit.

EXAMPLES OF PRECURSOR MONOMERS

In principle, any precursor monomer that can be activated, i.e. converted, to yield a polymerizable monomer can be used.

In the situations in which an intrinsically conducting polymer is produced in situ, suitable precursors to polymerizable monomers are molecules having a structure according to formula (I):

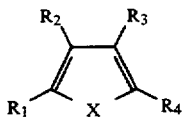

formula (I)

where
X is

—S— or —O—;
$R_1$ is hydrogen, —C(O)OH, —C(O)C(O)OH, —SO$_3$H, —C(O)H, —I or —Br;
$R_2$ is hydrogen, a $C_1$ to $C_{10}$ alkyl group, —C(O)OH, or a halogen;
$R_3$ is hydrogen, a $C_1$ to $C_{10}$ alkyl group, —C(O)OH, or a halogen; and —R
$R_4$ is hydrogen, —C(O)OH, —C(O)C(O)OH, —SO$_3$H, —C(O)H, —I or —Br,
provided that $R_1$ and $R_4$ are not both simultaneously hydrogen.

Preferably, pyrrole-2-carboxylic acid is used and the synthesis of this precursor monomer is described in J. Am. Pharm. Assoc. 45: 509 (1956), the disclosure of which is incorporated herein by reference.

All combinations of X, $R_1$, $R_2$, $R_3$ and $R_4$ are possible for precursor monomers according to formula I. The $R_1$ and/or $R_4$ groups ("blocking" or "protective" groups) can be removed, e.g. eliminated, thermally, such as by heat, or photochemically yielding a pyrrole, thiophene or furan monomer substituted or not substituted at the $R_2$ and/or $R_3$ position. The precursor of a polymerizable monomer is thus deblocked, i.e. activated, to yield a polymerizable monomer which can then polymerize freely via the $R_1$ and $R_4$ positions. The $R_2$ and $R_3$ groups can be the same, or be different. The $R_2$ and $R_3$ groups can together form a closed ring structure, i.e. complete a cyclic structure, such as, for example, a 3,4-(alkylene-vic-dioxy-)thiophene-2,5-dicarboxylic acid, which is described in Tetrahedron, 23: 2137-2441 (1967), the disclosure of which is incorporated herein by reference.

Other suitable precursor monomers from which an intrinsically conducting polymer can be prepared are precursor monomers having a structure according to formula (II):

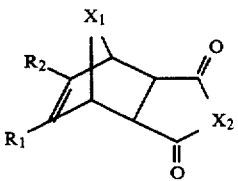

where
$X_1$ and $X_2$ are the same or different and are

—S— or —O—;
$R_1$ and $R_2$ are the same or different and are hydrogen or a $C_1$ to $C_{10}$ alkyl group; and
$R_4$ is hydrogen, or an alkyl, aryl or alkoxy group.

Precursor monomers according to formula (II) can be synthesized, for instance, as described in J. Chem. Soc. Perkin Trans. I pp. 1277-1284 (1985), the disclosure of which is incorporated herein by reference.

Yet still other suitable precursor monomers include 4-amino benzoic acid and 2-aminobenzoic acid and are obtainable as described in J. Chem. Soc. Perkin Trans. II, 1953 (1986), the disclosure of which is incorporated herein by reference. Also, 3,4-disubstituted thiophenes can be used, and these compounds are described in, for example, U.S. Pat. No. 4,987,042, the disclosure of which is incorporated herein by reference. These latter precursors are represented by Formula III:

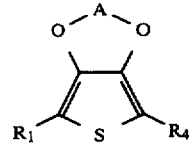

wherein A represents substituted or unsubstituted $C_1$ to $C_4$ alkyl.

The process according to the invention is not limited to the simultaneous use of precursor monomers of one kind. Combinations of different types of precursor monomers are possible. Optionally, if desired, precursor oligomers such as, for example, dimers or trimers can be used also.

ACTIVATION

The precursor monomer can be activated at the desired moment, for instance, by a thermal or photochemical treatment. Before this selected moment, substantially no polymerization will take place under the process conditions, even when the precursor monomers are in the presence of a suitable catalyst.

For example, molding compounds according to the invention can be heated or irradiated immediately after their formation, to initiate deblocking of the precursor monomers. The molding compounds can, of course, be stored with the precursor unactivated for further use, at which time the precursors are activated. As a general matter, the precise moment will be selected after the molding compound is formed.

The molding compound can be heated or irradiated, so that the precursor monomers are activated and polymerization occurs while forming a product. Such products include, for instance, fibers, films and a wide variety injection-molded articles. The injection-molded articles can be facilely made from molding compounds, granules or powder, although granules are preferred.

Photochemical activation of precursor monomers to obtain polymerizable monomers is described in concurrently filed U.S. application Ser. No. 08/091,716, filed Jul. 15, 1993, docket 200854/7496, the disclosure of which is incorporated herein by reference.

CATALYSTS

After activation of the precursor monomers, polymerization can take place. The polymerization is usually effected in the presence of a suitable catalyst which can be selected from among the group of generally known polymerization catalysts. To improve the electrically conducting properties of the electrically conducting polymer, the reaction mixture can also include a catalyst of the first type. A first type of catalyst includes those selected, for example, from the group of inorganic acids such as, for example, hydrochloric acid, sulfuric acid, chlorosulphonic acid and nitric acid; Lewis acids such as, for example, compounds containing positive ions of iron, aluminum, tin, titanium, zirconium, chromium, manganese, cobalt, copper, molybdenum, tungsten, ruthenium, nickel, palladium and/or platinum; and a halogen, a sulphate and/or a nitrate. Examples of other suitable catalysts include ozone, diazonium salts, organic oxidants for example benzoquinone, and persulphates, for example ammonium persulphate, sodium persulphate and potassium persulphate. In certain polymerization reactions Ziegler-Natta catalysts, $K_2Cr_2O_7$ or $(NH_4)_2S_2O_8$ exhibit useful, i.e. good, activity. Examples of catalysts with a good activity are $FeCl_3$, $K_3Fe(CN)_6$, $FeBr_3$, $FeCl_3 \cdot 6H_2O$, $Fe(NO_3)_3 \cdot 9H_2O$, $Cu(NO_3)_2$, $Fe(ClO_4)_3 \cdot 9H_2O$, $CuCl_2 \cdot 2H_2O$, $CuSO_4$, $Fe_2(SO_4)_3 \cdot 5H_2O$ and $(C_5H_5)_2Fe+FeCl_4$. If desired, the monomers can be polymerized in the presence of a mixture of catalysts. In view of the extremely high level of the electrically conducting properties of the resulting electrically conducting polymer, the catalyst preferably contains iron(III)chloride. The catalyst is usually added to the precursor monomer in a molar ratio that ranges between about 1:10 and about 10:1. Preferably, this ratio ranges between about 1:3 and about 3:1.

To obtain conducting polymers showing an improved stability of the conducting properties time at raised temperatures, the reaction mixture contains a catalyst having a strongly oxidizing cation and a stability promoting anion. The strongly oxidizing cation can be selected, for example, from the group of $Fe^{3+}$, $Os^{4+}$, $Mn^{4+}$, $Cr^{3+}$, $K^+$, $Cu^{2+}$, $Ce^{4+}$ and $(C_6H_5)_3C^+$. Preferably, the strongly oxidizing cation is $Fe^{3+}$. The stability promoting anion is usually a conjugated base of a strong acid. Stability promoting anion in the context of this embodiment means an anion of a relatively large organic compound, for example an aryl sulphonate compound, an alkyl sulphonate compound, a carboxylate compound, an acetate compound, or an acetonate compound. Preferably, the stability promoting anion is an aryl sulphonate compound or an alkyl sulphonate compound, substituted or not. Examples of such compounds are dodecyl benzene sulphonate, perfluorooctyl sulphonate, benzene sulphonate, ethyl benzene sulphonate, 2-naphthalene sulphonate, trifluoro acetate, perfluoro butyrate, methyl sulphonate, p-toluene sulphonate, 2,7-naphthalene disulphonate, trifluoro methyl sulphonate, 2,6-naphthalene disulphonate, 1,5-naphthalene disulphonate, dinonyl naphthalene sulphonate, 1,3-benzene disulphonate and 2,4,5-trichlorobenzene sulphonate. If desired a mixture of several of these compounds is used. Preferably, p-toluene sulphonate is used as stability promoting anion. The catalyst is usually added in a molar ratio to the precursor monomer that is between about 1:10 and about 10:1. Preferably, this ratio is between about 1:3 and about 3:1.

In this embodiment, the reaction mixture includes both a catalyst, which contains a strongly oxidizing cation and a stability promoting anion, and a catalyst of the first type with the molar ratio between the two catalysts being between about 10:1 and about 1:10. Preferably, the ratio between a catalyst containing a strongly oxidizing cation and a stability promoting anion and a catalyst of the first type is between about 10:1 and about 1:2, and more preferably is between about 2:1 and about 1:2.

In one embodiment according to the present invention, first a solution is made of a precursor monomer and a catalyst. In a few cases the precursor monomer itself can be used as solvent for the catalyst. Optionally, other components are added to this solution. These components can, for instance, include a liquid resin, an emulsion, a paint and/or pigments. When the resulting solution, or the resulting mixture, has been given its, desired form, for instance by smearing it onto a surface, activation of the precursor monomers can take place. The desired form may consist in, for instance, a layer applied onto a surface.

In the formation of an intrinsically conducting polymer, an eminently suitable application for a solution of a precursor monomer and a catalyst is the use of this solution in the preparation of a conducting coating or paint. In this embodiment, the solution of the precursor monomer with catalyst is optionally mixed with a liquid resin or paint. This liquid resin or paint can be added as matrix polymer to enable the mixture to be processed or to be given its desired form. The mixture obtained is subsequently applied onto a surface to be treated, upon which, for instance, a thermal or photochemical treatment takes place. This treatment causes the precursor monomers to be activated to yield polymerizable monomers, after which the monomers polymerize to form an intrinsically conducting polymer, while the curing reaction of the liquid resin or of the paint can, if desired, proceed simultaneously.

With this embodiment it has proven possible, in a simple manner, to obtain a coating or a paint that can be stored for quite a length of time without activation of the precursor monomers, and which can easily be provided, after its application onto a surface to be treated, with the desired intrinsically conducting properties.

The process according to the invention is also highly suited for the preparation of molding compounds, in which process the molding compound can easily be given any desired form. This is achieved according to the invention in that first a mixture or a solution containing precursor monomers and catalyst is given a desired form before the monomers forming a polymer after polymerization are obtained by in situ activation of the precursor monomers. Optionally, the above mixture or the above solution also contains a matrix polymer or the monomeric unit thereof.

MATRIX POLYMER

The matrix polymer can be selected within very broad limits. Depending on the requirements to be met by the polymer composition, for example requirements pertaining to mechanical properties, in principle any polymer may be selected. Because of their processing properties thermoplastic polymers are preferred, although thermosetting polymers such as, for example, resins and binders, are also extremely suitable as matrix polymer in certain applications. Examples of suitable matrix polymers include, among others, PPTA, polyvinyl chloride or copolymers of vinyl chloride and other vinyl monomers; polyvinylidene chloride and other vinyl monomers; polyvinylidene fluoride or copolymers of vinylidene fluoride and other vinyl monomers, polystyrene or copolymers of styrene and other monomers such as, for example, maleic anhydride and maleimide; polyacrylates or copolymers of an acrylate with other monomers; polyvinyl carbazole, polyolefins such as, for example, polyethylene, ultrahigh molecular polyethylene (UHMWPE) and polypropylene, polyvinyl acetate, polyvinyl alcohol; polyesters such as, for example, polyethylene terephthalate and polybutylene terephthalate; polycarbonates; polyether imides; polyimides; polytetrafluoroethylene; polyamides; polyamide-imides; polyethylene oxide; polybutadiene rubbers; alkyd resins; polyurethanes, acrylate resins; and the like. If desired, a mixture of several polymers can be applied as matrix polymer. In a few cases it is possible, instead of the matrix polymer, to add the monomeric units thereof.

The matrix polymer is necessary in order to make it possible for an intrinsically conducting molding compound to be formed.

The polymer composition containing the reaction mixture and a matrix polymer can be heated or irradiated at a selected time with a radiation source, so that the precursor monomers are activated, e.g. de-blocked. As indicated hereinabove, de-blocking can, for example, take place immediately after shaping of the polymer composition, but it is also possible to wait until a later point in time. In general, the time at which the post-shaping activation can be selected after the final form has been obtained. This makes the polymer composition finally prepared extremely suitable for the preparation of molding compounds, such as, for example, granules, powders, fibers or films.

SOLVENTS

A precursor monomer, and, optionally, a catalyst can be dissolved in a suitable solvent. In this aspect of the invention, a solvent is required in which the precursor monomer, as well as the catalyst, if added with the precursor, dissolves. The solvent can be water; an aromatic compound such as, for example, benzene, toluene and xylene; alcohol, such as, for example, methanol and ethanol; an hydrocarbon such as, for example, pentane and hexane; an ether such as, for example, dioxane, diethyl ether, ethyl methyl ether and tetrahydrofuran; a ketone such as, for example, a acetone, diethyl ketone and methyl ethyl ketone; a halogenated compound such as, for example, $CHCl_3$, $CH_2Cl_2$ and carbon tetrachloride; an ester such as, for example, ethyl formate and ethyl acetate; and other compounds such as, for example, acetonitrile, nitromethane, dimethyl sulphoxide, dimethyl formamide, triethyl phosphate, dimethyl acetamide and pyridine. A mixture of various solvents can be used.

A pH buffer can also be included in the solution as described hereinabove.

To a solution of precursor monomer and, if desired, a catalyst, a matrix polymer can be added whereby an electrically conducting polymer can be formed within that polymer matrix. Depending on the conditions, the matrix polymer may then dissolve, but it is possible also for the matrix polymer to continue to be present in non-dissolved form. The solubility of the matrix polymer depends to a high degree on the temperature of the solvent and the concentration of the matrix polymer.

If the added matrix polymer does not dissolve (completely) in the selected solution, a matrix polymer is formed and impregnated with a solution containing precursor monomer and—optionally—catalyst. For instance, a porous molded article can be impregnated with a mixture comprising precursor monomer, catalyst, and buffer. This embodiment can be used in the production of, preferably porous, molding compounds such as, for instance, granules, fibers or films, which contain a mixture of matrix polymer, precursor monomer and optionally catalyst. These porous molding compounds can be stored, if so desired, until the moment at which they are to be used in the manufacture of a desired product. The precursor monomers can then be activated at the selected and desired time by means of, for instance, a thermal or photochemical treatment, after which a product is obtained with the desired properties. The invention therefore also relates to such molding compounds.

If the matrix polymer dissolves completely in a solution containing precursor monomer and optionally—catalyst, a further solution is formed. The continuous preparation of fibers and films from such a further solution which has viscoelastic properties. To this end it is important that the further solution obtained should be capable of being properly spun. This spinnability is determined to a high degree by the concentration of the matrix polymer to be added and by the amount of solvent. The spinnability of a solution can be determined as is described, for instance, in Tammann G., Tampke R., Z. Anorg. Allg. Chemie, Bd. 162 (1927) pp. 1–16. The mechanical properties of fibers and films can be improved considerably by means of after stretching.

The above embodiment can be used in combination with so-called Reaction Injection Molding (RIM) techniques. In this particular embodiment a mixture comprising a precursor monomers, a catalyst and, optionally, for instance, a low viscosity resin is introduced into a preheated mould. The temperature of this mould is such that the precursor monomers are activated, where upon polymerization occurs. Optionally, instead of a low viscosity resin, a liquid monomer can be used, which, by polymerization—simultaneously with the polymerization of the activated precursor monomers into a polymer—forms a matrix polymer. The heated mould may be of any desired form. Suitable resins that can be used in this particular embodiment include, for instance, epoxy resins, polyester resins, melamine-urea-formaldehyde resins and BMI resins. When suitable precursormonomers are used, this embodiment constitutes an excellent means for preparing intrinsically conducting molding compounds.

In a still further embodiment, the precursor monomer and the catalyst are mixed with a wholly or partly molten thermoplast. In this embodiment, the precursor monomer and the catalyst are fed to an intimate mixer, which already contains a wholly or partly molten thermoplast to obtain a mixture. This mixture is subsequently given a desired form, for instance by injection molding. The temperature of the wholly or partially molten thermoplast is such that no complete thermal activation and conversion of the precursor monomer into a polymerizable monomer takes place until after the molding. Under the influence of the catalyst, polymerization takes place, optionally during simultaneous devolatilization of the mixture for the removal of volatile components. It will be clear that it is very important for the polymerization of the activated precursor monomers to take place to a large extent after the mixture has been given its desired form. Therefore, in order to cause the polymerization to proceed with the desired result, it is of paramount importance that the process temperature and the throughput of the mixture in the intimate mixer should be accurately controlled. An intrinsically conducting molding compound comprising an intrinsically conducting polymer and a thermoplast can be obtained in one, if so desired continuous, process step using this mode of realizing the process according to the invention.

If desired the electrically conducting polymer can be formed within a polymer matrix. To this end the reaction mixture has to be present in a finely divided form in the polymer matrix and activated and polymerized in that position. This form and the amount of precursor monomer present in the reaction mixture is selected so that in the product, after polymerization, continuous paths of conducting polymer are produced. The amount required ranges from 1–50 wt %, preferably from 5–30 wt %. Examples of suitable forms will be given below. A person skilled in the art will appreciate also other methods to obtain the required finely divided form. The required form can for instance be obtained by dispersing or dissolving the matrix polymer in the reaction mixture. The dispersion or solution then can be shaped by the usual techniques and after shaping the conducting polymer can be formed by deblocking the precursor monomer. Another possible embodiment is to impregnate a porous object of the matrix polymer with the reaction mixture and subsequently conducting the steps required for the forming of the conductive polymer described hereinbefore.

In those embodiments involving electrically conducting polymers, the desired weight ratio between the amount of matrix polymer and the amount of electrically conducting polymer in the composition according to the invention is arrived at by balancing and optimizing the various desired properties, for example the electrically conducting properties on the one hand versus the desired mechanical properties on the other. Unduly high concentrations of matrix polymer have an adverse effect on the conductivity in the resulting polymer composition, whereas while lower concentrations of matrix polymer can have an adverse effect on the desired mechanical properties. The optimum concentration of the matrix polymer is determined to a considerable degree by the molecular weight and the degree of branching of the matrix polymer. For example, by applying the process according to the present invention, a molding compound of any desired form can be obtained in a simple manner. By applying the process according to the invention it is possible to postpone the polymerization into a hard-to-process polymer until the final desired form has been obtained. Thus it is very well possible to make molding compounds without any adverse effects on the properties of the final molding compounds obtained.

In these embodiments, the weight ratio between the amount of matrix polymer and the amount of electrically conducting polymer in the polymer composition according to the invention may vary within broad limits. In general ratio is between about 1:99 and about 99:1, preferably between about 1:15 and about 15:1. The optimum concentration of the matrix polymer is determined to an important extent by the molecular weight and the degree of branching of the matrix polymer.

For instance, products and articles having good electrical conducting properties, including molding compounds, can be obtained with appropriate selection of suitable precursor monomers. For example, depending on the precursor monomer used, the conductivity of the intrinsically conducting molding compound can be adjusted to the desired level by means of an (oxidative or reductive) doping steps in which the known doping techniques and reactants can be used.

Depending on the electrically conducting polymer obtained, the electrically conducting properties can be improved by means of an (oxidative or reducing) doping step, in which use can be made of the known doping techniques and reagents. These are mentioned, for example, in Skotheim, *Handbook of Conducting Polymers* (1986).

As contemplated herein, conducting properties of the desired level usually connotes a minimum specific conductivity of, for instance, 0.01 S/cm, measured according to the so-called four-probe technique.

After polymerization or shaping of the polymer or molding compositions or films or fibers of the present invention, any catalyst residues and other low-molecular components can be re,moved by means of extraction and/or evaporation. These are generally known methods.

Optionally, up to 60 weight percent of fillers and/or antioxidants can be added in making products in accordance with the present invention. For instance, in the preparation of molding compounds according to the invention, to about 60% (wt) fillers and/or anti-oxidants can be added, either by admixture in the solution or in the mixture obtained, or by admixture in a wholly or partly molten thermoplast before addition of the solution. Examples of fillers to be added are talcum, fibers, pigments, kaolin, wollastonite and glass. Examples of fillers to be added are talc, fibers, pigments, kaolin, wollastonite and glass The molding compounds according to the invention can be obtained, for instance, by extrusion of the mixture or the solution of matrix polymer, precursor monomer and catalyst.

Products obtained by the process according to the invention can be applied in widely divergent fields. Examples include molding compounds, coatings and EMI-shielding devices. Still further, other suitable applications such as conducting films.

An electrically conductive article can also be produced from a polymer composition comprising stretching a carrier polymer containing monomers wherein the polymer composition contains precursor monomers prior to stretching and the monomers are obtained during stretching. Such processes are also described in U.S. patent application No. 07/998,296 filed Dec. 30, 1992, the complete disclosure of which is incorporated herein by reference.

The complete disclosures of each of Netherlands application 9201277 filed Jul. 15, 1992 and Netherlands application 9201275 filed Jul. 15, 1992 are incorporated herein by reference.

The invention is elucidated by means of the following non-limiting examples.

EXAMPLES

Unless otherwise stated, the conducting properties have been measured according to the so-called four point (probe) method. A concise description of this method is given in Europe A-314311, although Wieder, Laboratory Notes on Electrical and Galvanomagnetic Measurements, (1979) contains a more detailed description. This method was used to measure the specific conductivity:

$$\sigma = (L/A) * (1/R),$$

where $\sigma$ = specific conductivity [S/cm]
L = distance between the two innermost electrodes [cm]
R = resistance [Ohm]
A = transverse surface area [cm$^2$].

In the Examples, the softening temperature, when determined, was determined as the Vicat softening temperature according to ASTM standard D 1525-76, with a weight of 5 kg, using a CEAST 6520 HDT-Vicat apparatus.

The Gurley value is a measure for the air permeability and, when measured in an Example, it was determined according to ASTM-standard D726-58 using a measuring area of 6.45 cm$^2$ (1 sq. inch) and a load of 567 grams.

To the extent reported in the Examples, the static mechanical properties were determined using a Zwick 1435 tensile tester at a testing speed of 30 mm/min on a specimen with a width of 10 mm, while the clamping length is 30 mm at 23° C. and 65% relative humidity. The dynamic modulus is determined using a Rheometrics Solid Analyzer RSA-2 at a frequency of 0.2 Hz, a deformation of 0.1% and a heating rate of 5° C./min.

Example I

In 50 ml tetrahydrofuran (THF) pyrrole-2-carboxylic acid (1.0 gram) was dissolved at a temperature of 200° C. To the colorless clear solution a solution of 4 grams FeCl$_3$. 6H$_2$O in 50 ml water was added. The resulting reddish brown solution was stored for one night without any noticeable reaction.

Subsequently, the reddish brown solution was heated for 30 minutes to a temperature of 600° C. A black precipitate was formed. After filtering off this precipitate, a green solution remained. The precipitate was thoroughly washed with water and acetone and subsequently dried in an oven at a temperature of 50° C. The yield was 300 mg. The powder obtained was doped for 5 days using iodine vapor. After pressing a tablet of this powder (200° C. and 100 bar), a specific conductivity ($\sigma$) of 9.7 10$^{-3}$ S/cm was measured.

Example II

In 7 ml tetrahydrofuran (THF), 250 mg pyrrole-2-carboxylic acid and 700 mg iron trichloride were dissolved at a temperature of 200° C. A porous PE film (porosity 0.85; 2.0×3.0 cm$^2$) was impregnated in this solution for 60 seconds. After that, the film was taken from the bath and heated in an oven for 5 minutes to 100° C. The resulting black film was subsequently subjected to extraction using acetone. After extraction and drying a specific conductivity ($\sigma$) of 1.1 S/cm was measured.

Comparison Example A

In 7 ml tetrahydrofuran (THF) 700 mg iron trichloride (700 mg) was dissolved at a temperature of 200° C. Subsequently, pyrrole (250 mg) was added, upon which a black powder was formed at once. A porous PE film (porosity 0.85; 2.0×3.0 cm$^2$) was impregnated in this solution for 60 seconds. After that, the film was taken from the bath and heated in an oven for 5 minutes to 100° C. The resulting film was subsequently subjected to extraction using acetone. After extraction and drying a specific conductivity ($\sigma$) of 0.2 S/cm was measured.

Example III

In 1 ml tetrahydrofuran (THF) thiophene-3-methyl-2-carboxylic acid (500 mg) was dissolved at a temperature of 20° C. To this solution a solution of 1.2 grams FeCl$_3$ in 3 ml methanol was added. A porous polyethylene ("PE") film (with a porosity ($\epsilon$) of 0.85) was subsequently impregnated for 30 seconds with the solution obtained, upon which the impregnated film was heated for 5 minutes at 120° C. After extraction and drying a poly(4-methyl-thiophene)/PE film was obtained with a specific conductivity of 0.5 S/cm.

Example IV 4-methyl-thiophene-5-carboxylic acid (500 mg) and FeCl$_3$ (1140 mg) were dissolved in a mixture of 3 ml methanol and 1 ml THF. A porous PE film (with a porosity ($\epsilon$) of 0.85) was impregnated with this solution for 30 seconds. The film thus obtained was heated for 5 minutes to a temperature of 120° C. The film was subsequently doped for 5 minutes using a solution of 500 mg NOSbF$_6$ in 30 ml CH$_3$CN. The specific conductivity of the film obtained was 4.3 S/cm.

Example V

Example IV was repeated, except that, after heating to 120° C. the porous PE film was impregnated once again for 60 seconds. The film was subsequently doped for 5 minutes using a solution of 500 mg NOSbF$_6$ in 30 ml CH$_3$CN. The specific conductivity of the film obtained was 10.4 S/cm.

Example VI

In 10 ml methanol pyrrole-2-carboxylic acid (250 mg) and FeCl$_3$ (700 mg) were dissolved at a temperature of 20° C. Subsequently, 600 mg polyvinyl chloride powder (PVC powder, M$_W$=70000 g/mole) was subsequently impregnated with this solution for 5 minutes. After filtration, the powder was air-dried for one night. Subsequently, from the impregnated powder a film was molded for 10 minutes at a temperature of 160° C. and a pressure of 60 bar. The specific conductivity of the resulting black film was 1.1 10$^{-5}$ /cm.

Example VII

In 25 ml tetrahydrofuran (THF) were dissolved 1 gram pyrrole-2-carboxylic acid, 2.9 grams anhydrous FeCl$_3$ and 3.3 grams polyvinyl acetate (PVAc) at a temperature of 20° C. Using a doctor blade a 100-μm-thick layer of the solution obtained was spread out on a polyethylene terephthalate (PET) film. The film, with the yellowish solution on it, was subsequently heated in an oven for 3 minutes at a temperature of 95° C. During this heating process a discoloration of the solution took place from yellow to black. After extraction with acetone and drying, a specific conductivity of 4.0 10$^{-3}$ S/cm was measured.

Example VIII

In 3.5 ml THF, 250 mg pyrrole-2-carboxylic acid and 700 mg FeCl$_3$ were dissolved. To this solution alkyd resin was added ( 400 mg; high fatty acid content, viscosity 50 poise). The mixture obtained was applied in the form of a coating on a polyethylene terephthalate (PET) film. After the resulting coated film had been heated for 5 minutes to 100° C., it was subjected to extraction using water and acetone. The specific conductivity of the coating was 0.4 S/cm.

Example IX

In a mixture of 1.5 ml THF and 1.5 ml methanol, 250 mg pyrrole-2-carboxylic acid and 700 mg FeCl$_3$ were dissolved. Subsequently, a teflon film (2.0×3.0 cm$^2$, GORE-TEX ®) with a thickness of 35 μm was impregnated for 30 seconds using this solution. The impregnated film was subsequently heated for 5 minutes at 100° C. After extraction with acetone the specific conductivity of the resulting polypyrrole/teflon film was measured. It was 0.6 s/cm.

Example X

Example IX was repeated, except that a micro-porous (MD)PE film (2.0×3.0 cm$^2$) was impregnated (this film is described in Europe 0184392). The thickness of this film was 30 μm. The impregnated film was heated for 3 minutes at 100° C. After extraction with acetone, the conductivity measured on the resulting film was 0.8 S/cm.

Example XI

At a temperature of 20° C. FeCl$_3$ (6.80 g) was dissolved in 12 ml of tetrahydrofuran. Then, 2.00 g of pyrrole-2-carboxylic acid and 1.09 g of urea were dissolved in 20 ml of ethanol at a temperature of 20° C. The two solutions were combined and the resulting solution was used to impregnate a 47 μm thick, porous polyethylene film (5.0 * 6.0 cm$^2$, porosity 86%). The impregnation period was 60 seconds.

The resulting film was heated for 5 minutes in an oven at a temperature of 110° C. The film color gradually changed from reddish brown to black.

The black film was extracted with acetone and air dried. The specific conductivity of the film was measured to be 2.5 S/cm.

Example XII

At a temperature of 20° C., pyrrole-2-carboxylic acid (500 mg) and urea (270 mg) were dissolved in 5 ml of solvent (85 vol. % methanol and 15 vol. % water). In addition, 1.68 g of FeCl$_3$ was dissolved in 5 ml of solution (85 vol. % methanol and 15 vol. % water) at a temperature of 20° C. The two solutions were combined and the resulting solution was used to impregnate a 47 μm thick, porous polyethylene film (5.0 * 6.0 cm$^2$porosity 8.6%) The impregnation period was 60 seconds.

After having been air-dried, the resulting film was placed between two glass plates and heated for 5 minutes in a oven at a temperature of 110° C.

The resulting black film was extracted with acetone and air-dried. The specific conductivity of the film was measured to be 11.2 S/cm.

Example XIII

At a temperature of 20° C. 1.00 g of 3-methylthiophene-2-carboxylic acid and 0.42 g urea were dissolved in 5 ml of diethyl ether. In addition, 2.28 g of FeCl$_3$ was dissolved in 5 ml of diethyl ether at a temperature of 20° C. The two solutions were combined and the resulting solution was used to impregnate a 47 μm thick, porous polyethylene film (5.0 * 6.0 cm$^2$, porosity 86%). The impregnation period was 60 seconds.

The impregnated film was heated for 5 minutes in a oven at a temperature of 120° C. After extraction the deep-red film was doped with NOSbF$_6$(0.50 g in 30 ml of CH$_3$CN) until the film color (after some 10 seconds) changed into blue-grey.

The resulting film was extracted with acetone and air-dried. Then, the entire cycle comprising impregnation, heating, doping, extraction and drying was repeated. The specific conductivity of the film was measured to be 20.0 S/cm.

Example XIV

At a temperature of 20° C. 1.00 g of 3-methyl-thiophene-2-carboxylic acid and 0.42 g urea were dissolved in 5 ml of solvent (6 parts by volume of methanol, 1 part by volume of water and 3 parts by volume of diethyl ether). In addition, 2.28 g of FeCl$_3$ was dissolved in 5 ml of this ternary mixture at a temperature of 20° C. After the two solutions had been combined, the resulting solution was used to impregnate a 47 μm thick, porous polyethylene film (5.0 * 6.0 cm$^2$, porosity 86%). The impregnation period was 60 seconds, and subsequently this film was heated for 10 minutes in a oven at a temperature of 120° C.

The resulting film was extracted with acetone and doped in the same manner as in Example XIII. After the resulting film had been extracted with acetone and air-dried, the specific conductivity of the film was measured to be 28.0 S/cm.

Comparison Example B

At a temperature of 20° C. 0.25 g of pyrrole-2-carboxylic acid was dissolved in 1.5 ml of tetrahydrofuran. Then, 0.70 g of FeCl$_3$ was dissolved in 2.5 ml of ethanol at a temperature of 20° C. The two solutions were combined, and the resulting solution was used to impregnate a 47 μm thick, porous polyethylene film (5.0 * 6.0 cm$^2$, porosity 86%). The impregnation period was 60 seconds.

The resulting film was heated for 5 minutes in a oven at a temperature of 110° C. The film color gradually changed from reddish brown to black.

The film was extracted with acetone and air-dried.

The specific conductivity of the film was measured to be 0.5 S/cm.

Comparison Example C

At a temperature of 20° C. 0.50 mg of pyrrole and 0.45 g urea were dissolved in 8 ml of solvent (85 parts by volume of methanol, 15 parts by volume of water). In addition, 2.78 g of FeCl$_3$ was dissolved in 5 ml of the same solvent at a temperature of 20° C. The two solutions were combined, and instantaneously a black precipitate was formed. Te resulting mixture was used to impregnate a 47 μm thick, porous polyethylene film (5.0

, 6.0 cm² porosity 86%). The impregnation period was 60 seconds. The film was then heated in an oven at a temperature of 110° C. for 15 minutes.

The grey, inhomogeneous film was subsequently extracted with acetone and air-dried. The specific conductivity of the film was measured to be 1.0 S/cm.

Example XV

Preparation method for iron(III) (p-toluene sulphonate)₃

14.6 g of FeCl₃6H₂O (Merck) was dissolved in 204 ml of demineralized water. A clear solution with a dark yellow - orange color was obtained. A solution of 6.5 g of NaOH (Merck, pure) in 44 ml of demineralized water was subsequently added to this solution, which was meanwhile being stirred vigorously. The resulting iron hydroxide was decanted, washed three times with demineralized water, and filtered using a glass filter (20–40 μm, D3).

The iron hydroxide was dissolved in 102 ml of methanol. A solution of 29 g of p-toluene sulfonic acid monohydrate (Merck) in 44 ml of methanol was added to this solution. A black suspension was formed. This suspension was heated for 2 hours at a temperature of 45° C. while being stirred, and this caused the precipitate to dissolve almost entirely. The resulting solution was subsequently filtered using filter paper.

Under reduced pressure the solvent was largely removed with a rotating film evaporator at a temperature of 50° C. The resulting product was then dried for 196 hours in a vacuum stove at a temperature of 50° C. The remaining orange-yellow powder was finally ground using pestle and mortar and stored in a desiccator with P₂O₅ (N₂ atmosphere). The iron(III) (p-toluene sulphonate)₃ yield was 29 g.

Example XVI

A solution was prepared of 0.25 g of pyrrole-2-carboxylic acid in 1.5 ml of tetrahydrofuran (solution A). A second solution was prepared of 1.48 g of iron(III) (paratoluene sulphonate)₃ and 0.42 g of iron(III)chloride in 2.5 ml of tetrahydrofuran (solution B). The two solutions were poured together, yielding a dark solution Subsequently, a porous PE film (2*4 cm², thickness 47 μm, porosity 85%) was impregnated with this solution by immersing the film for 30 seconds.

The impregnated film was air-dried for 15 minutes and then kept in an oven at a temperature of 110° C. (nitrogen atmosphere) for 5 minutes. Polymerization yielding polypyrrole occurred. Finally the film was extracted with acetone until the acetone remained colorless, and then another time with methanol.

The specific conductivity measured, σ0, was 0.2 S/cm.

Example XVII

Example XV was repeated, but this time a film with a thickness of 47 μm and an oven temperature of 136° C. were used. Polymerization yielding polypyrrole took place. The specific conductivity measured, σ0, was 0.3 S/cm.

Example XVIII

A solution was prepared of 0.25 g of pyrrole-2-carboxylic acid in 1.5 ml of tetrahydrofuran (solution A). A second solution was prepared of 0.74 g of iron(III)(p-toluene sulphonate)₃ and 0.63 g of iron(III)chloride in 2.5 ml of tetrahydrofuran (solution B). The two solutions were poured together at a temperature of 20° C., yielding a dark solution. Subsequently, a porous PE film (2*4 cm², thickness 47 μm) was impregnated with this solution by immersing the film for 30 seconds.

The impregnated film was air-dried for 15 minutes and then kept in an oven for 5 minutes at a temperature of 136° C. (nitrogen atmosphere). Polymerization yielding polypyrrole occurred. Finally the film was extracted with acetone until the acetone remained colorless, and then another time with methanol.

The specific conductivity measured, σ0, was 0.2 S/cm.

Example XIX

A solution was prepared of 0.25 g of pyrrole-2- carboxylic acid in 1.5 ml of tetrahydrofuran (solution A). A second solution was prepared of 2.21 g of iron(III)(p-toluene sulphonate)₃ and 0.21 g of iron(III)chloride in 2.5 ml of tetrahydrofuran (solution B). The two solutions were poured together at a temperature of 20° C., yielding a dark solution. Subsequently, a porous PE film (2, 4 cm², thickness 47 μm) was impregnated with this solution by immersing the film for 30 seconds.

The impregnated film was air-dried for 15 minutes and then kept in an oven for 5 minutes at a temperature of 136° C. (nitrogen atmosphere). Polymerization to polypyrrole occurred. Finally the film was extracted with acetone until the acetone remained colorless, and then another time with methanol.

The specific conductivity measured, σ0, was 0.07 S/cm.

Example XX

Of the films obtained in Examples XV–XIX, the stability of the conducting properties was measured by placing the films for 24 hours in an oven through which air was passed, the temperature being 120° C. After this temperature treatment the specific conductivity, σ1, was measured again. The properties measured are listed in Table 1:

TABLE 1

| | Film Specific Conductivity [S/cm] | | Retention |
|---|---|---|---|
| | σ0 | σ1 | σ1/σ0 |
| XVI | 0.2 | 0.02 | 0.10 |
| XVII | 0.3 | 0.025 | 0.08 |
| XVIII | 0.2 | 0.008 | 0.04 |
| XIX | 0.07 | 0.008 | 0.11 |

Comparison Example D

In 7 ml of tetrahydrofuran 2.46 g of iron(III)-(p-toluene sulphonate)₃ was dissolved at a temperature of 20° C. Subsequently, 250 mg of pyrrole was added, which immediately resulted in formation of a black precipitate.

Example XXI (reference example)

The Vicat softening temperature of polypyrrole and poly(4-methylthiophene) was determined on pressed specimens. Within the range of the measuring equipment, which runs up to 200° C., the required penetration depth of 1 mm was not reached. It can therefore be concluded that the Vicat softening temperature of polypyrrole and poly(4-methylthiophene) lies above 200° C.

Example XXII 250 mg pyrrole-2-carboxylic acid and 700 mg iron (III) chloride were dissolved in 7 ml tetrahydrofuran (THF) at a temperature of 20° C. From a porous UHMWPE film with an intrinsic viscosity of 15.5 dl/g, a porosity of 85% and a Vicat softening temperature of 80° C., hereinafter referred to as basic film, a specimen measuring 2×3 cm² was cut. This specimen was immersed in the solution described for 60 seconds to impregnate this specimen with the solution. The film was then removed from the bath and heated for 5 minutes in an oven up to 100° C. The area of the film decreased by about 3%. A black film was obtained. Using acetone, any oligomers formed, residual iron (III) chloride and the iron (II) chloride formed were extracted from the resulting black film. After extraction and drying the porosity of the resulting, internally and externally coated film was 66%. From the weight increase of the film it follows that the film's polypyrrole content amounts to 13.8 wt. %. The specific conductivity of the film was 1.1 S/cm, calculated on the basis of the film dimensions.

For the basic film, the breaking strength, elongation at break and force needed for 1% elongation were 30 N/25 mm, 23% and 2.0 N/25 mm, respectively, and for the polypyrrole-coated film they were 36N/25 mm, 26% and 2.3 N/25 mm, respectively. The mechanical properties of the coated film therefore virtually agree with those of the basic film. The temperature dependence of the dynamic modulus of the basic film and that of the coated film were determined and presented in FIG. 1. FIG. 1, the temperature in ° C. is plotted on the horizontal axis and the dynamic modulus in Pa on the vertical axis. The modulus of the basic film, curve A, decreases strongly near the melting point of the polyethylene, to fall to zero at the melting point. The modulus of the coated film, curve B, initially decreases with increasing temperature, but reaches a plateau value of over 60 MPa, which remains at the same level up to about 350° C., though the figure only goes to 200° C.

Example XXIII

Example XXII was repeated with a PE-film with a porosity of 84%, a Gurley value of 2.4 s/50 ml. The porosity and Gurley value of the coated film were 69% and 36.4 s/50 ml. resp. The coated film was kept in an oven at 180° C. for 1 hour and cooled to room temperature. The porosity and Gurley value then were 63. 5% and 30 S/50 ml resp.

Example XXIV

Figure 2:
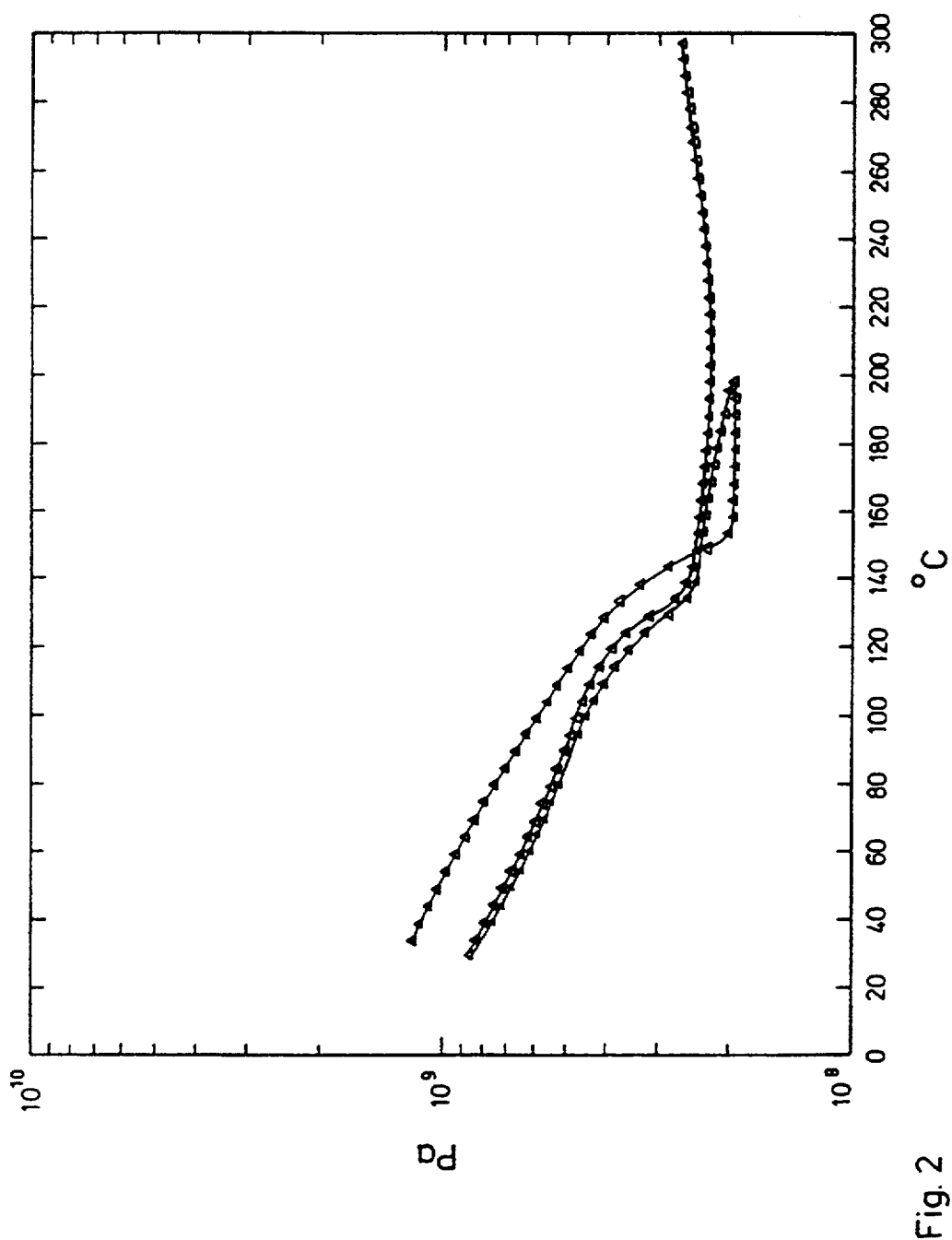

A polypyrrole-coated polyethylene film is prepared as described in Example XXII, except that dissolving takes place in 5 ml tetrahydrofuran. FIG. 2, with the temperature in ° C. plotted on the horizontal axis and the dynamic modulus in Pa on the vertical axis, shows the changes in the dynamic modulus of the coated film upon, successively, heating from room temperature to 200° C. cooling to room temperature, and re-heating to 300° C. From FIG. 2 it appears that after heating to 200° C., at temperatures below the melting point of polyethylene the modulus of the coated film is approximately 85% of its original value, while above the melting point the modulus is retained completely.

Comparison Example E

Of a fully polyurethane-filled porous High-density polyethylene (HDPE) film (Thintech ®, make 3M ) the temperature dependence of the dynamic modulus is determined. At 120° C., the melting point of the HDPE, this modulus is only 5 MPA, decreasing rapidly to almost zero upon an increase in temperature. This behavior is fully in line with curve B in FIG. 1. The stressed film first undergoes a distinct dimensional change in the form of contraction and finally breaks.

Comparison Example F

A UHMWPE basic film as described in Example XXII is immersed in a solution of 10 vol. % pyrrole in chloroform. After impregnation the film was air-dried for 10 seconds. The pyrrole-filled film was immersed in an aqueous 2.88M iron (III) chloride solution for 30 minutes. From the resulting black film the excess reagents were removed, first with water and then with acetone, following which the film was dried. Microscopic examination of a cross-section of the film revealed that the pyrrole was present mainly on the external film surface. The electrical conductivity of the film was 0.6 S/cm. After extraction and drying, the film was heated to 180° C., yielding a corrugated film with scalloped edges. In contrast with the film according to the invention, the film thus coated with pyrrole therefore is not dimensionally stable at this elevated temperature.

Comparison Example G

A porous PE-film with a porosity of 81% was immersed for 1 hour in a saturated solution of $FeCl_3.6H_2O$ in methanol. The surplus of solution then was removed with tissue-paper. The film coated with $FeCl_3$ was exposed in a closed vessel to vapor of pyrrol during 6 hours. A grey-to-black film was obtained in this way. The film was still permeable to air (Gurley value of 77 s/50 ml). After exposure to a temperature of 180° C. for 1 hour the film had shrunk into a black lump, indicating that the internal and/or external surface of the film were not provided with a continuous layer of polypyrrol.

Example XXV

At a temperature of 20° C. 500 mg thiophene-3-methyl-2-carboxylic acid is dissolved in 1 ml THF. A solution of 1.2 g $FeCl_3$ in 3 ml methanol is added to this solution. During 30 seconds a porous PE film with a porosity of 85% is impregnated with the resulting solution, after which the impregnated film is heated at 120° C. for 5 minutes. A PE film is obtained the pores and the outside of which are covered with a continuous layer of poly (4-methyl-thiophene). The entire film has a specific conductivity of 0.5 S/cm. The porosity ,and the Gurley value of the coated film are 73% and 15 s/50 ml.

Example XXVI

In a mixture of 1.5 ml THF and. 1.5 ml methanol, 250 mg pyrrole-2-carboxylic acid and 700 mg $FeCl_3$ were dissolved. A PTFE film (2×3 cm² GORE-TEX ® from Gore) having a thickness of 35 μm was immersed in this solution for 5 minutes. The impregnated film was subsequently heated for 5 minutes at 100° C. After extraction with acetone the specific conductivity of the resulting polypyrrole-coated PTFE film was measured and was 0.6 S/cm. The Vicat softening temperature of the PFTE was below room temperature.

Example XXVII

Figure 3:
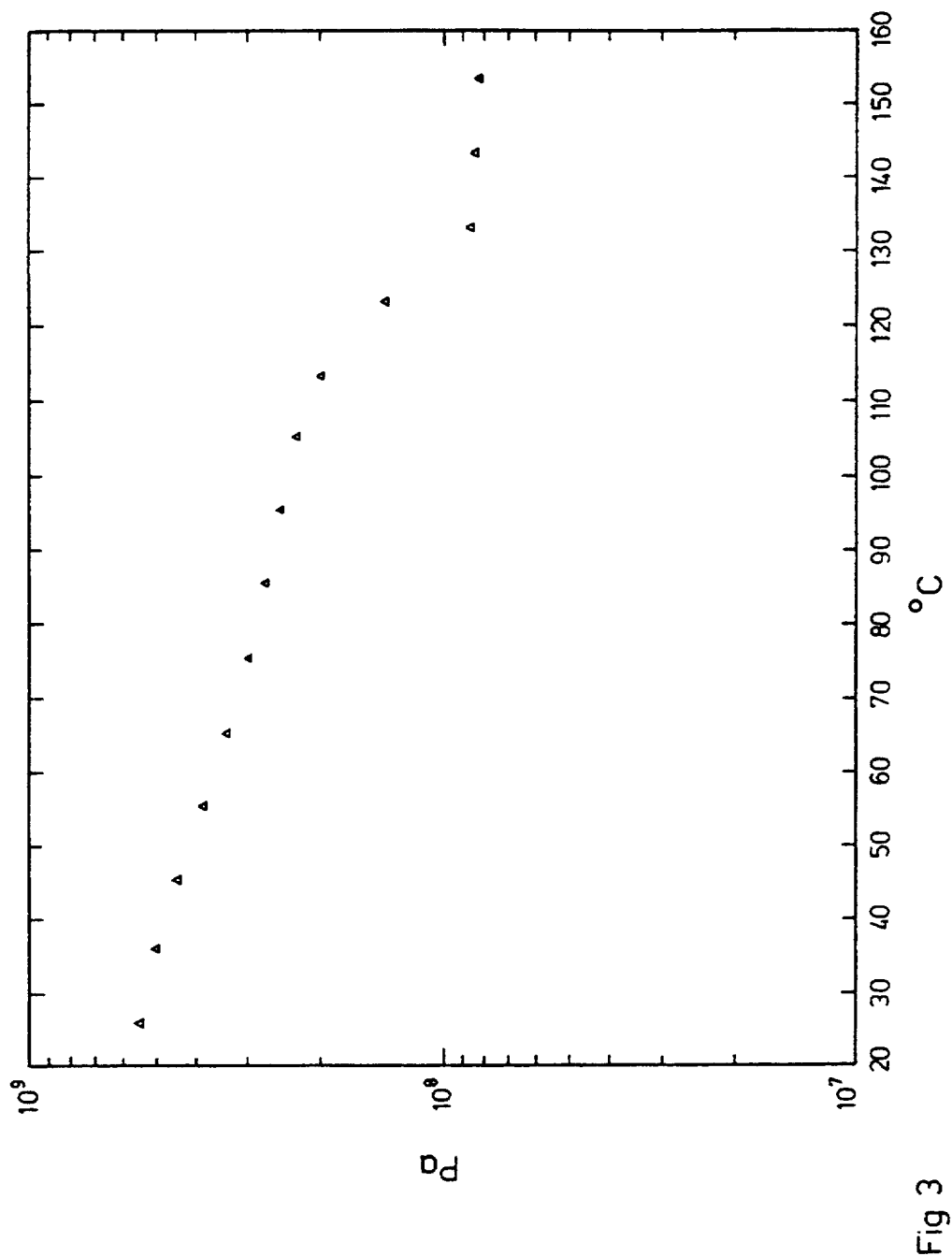

Example XXVI was repeated, but now a microporous HDPE film (2×3 cm²) was impregnated (this film is described in U.S. Pat. No. 4,613,544). The thickness of this film was 30 μm and the softening temperature was 48° C. The impregnated film was heated for 3 minutes at 100° C. After extraction with acetone, a conductivity measurement on the resulting film yielded a value of 0.8 S/cm. The film proved to be dimensionally stable at temperatures up to at least 200° C. The changes in the dynamic modulus as a function of the temperature are presented in FIG. 3, in which the temperature in ° C. is plotted on the horizontal axis while the dynamic modulus in Pa is plotted on the vertical axis. At 200° C. the dynamic modulus of the film is 80 MPa.

Example XXVIII

A polyethylene film measuring 2×3 cm², internally and externally coated with polypyrrole and prepared by the process of Example XXII was kept in a decalin bath at 180° C. for one hour. The dimensions and the porosity of the film remain unchanged.

What is claimed is:

1. Process for preparing a polymer comprising in situ activating precursor monomers to obtain polymerizable monomers, and allowing the monomers to polymerize in the presence of a catalyst, wherein said precursor monomers have a structure according to formula (I):

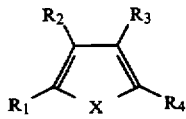

formula (I)

where
X is

—S— or —O—;
$R_1$ is hydrogen, —C(O)OH, —C(O)C(O)OH, —SO$_3$H, —C(O)H, —I or —Br;

$R_2$ is hydrogen, a $C_1$-$C_{10}$ alkyl group, —C(O)OH, or a halogen;

$R_3$ is hydrogen, a $C_1$-$C_{10}$ alkyl group, —C(O)OH, or a halogen; and $R_4$ is hydrogen, —C(O)OH, —C(O)C(O)OH, —SO$_3$H, —C(O)H, —I or —Br, with the proviso that $R_1$ and $R_4$ are not both hydrogen simultaneously.

2. Process for preparing a molding compound in which the polymer is prepared according to claim 1, wherein a mixture or a solution containing said precursor monomers and catalyst is given a desired form and thereafter the monomers are obtained by in situ activating said precursor monomers.

3. Process according to claim 2, wherein the mixture also contains a matrix polymer, or the monomeric unit thereof.

4. Process according to claim 3, wherein the matrix polymer is a low-viscosity resin.

5. Process according to claim 3, wherein the mixture or the solution is introduced into a preheated mould.

6. Process according to claim 3, wherein the matrix polymer is a liquid resin, a paint or an emulsion.

7. Process according to claim 3, wherein the matrix polymer is a thermoplastic polymer.

8. Process according to claim 7, wherein the mixture is obtained by mixing a solution containing precursor monomer and catalyst with a wholly or partly molten thermoplast.

9. Process according to claim 1, wherein the catalyst comprises a transition metal and a halogen.

10. Process according to claim 9, wherein the catalyst is iron trichloride or copper dichloride.

11. Process according to claim 1, wherein the precursor monomer is pyrrole-2-carboxylic acid.

12. A process according to claim 1, wherein the monomers polymerize in the presence of a pH buffer.

13. A process according to claim 1, wherein the catalyst comprises an oxidizing cation and a stability promoting anion.

* * * * *